United States Patent Office 3,280,949
Patented Oct. 25, 1966

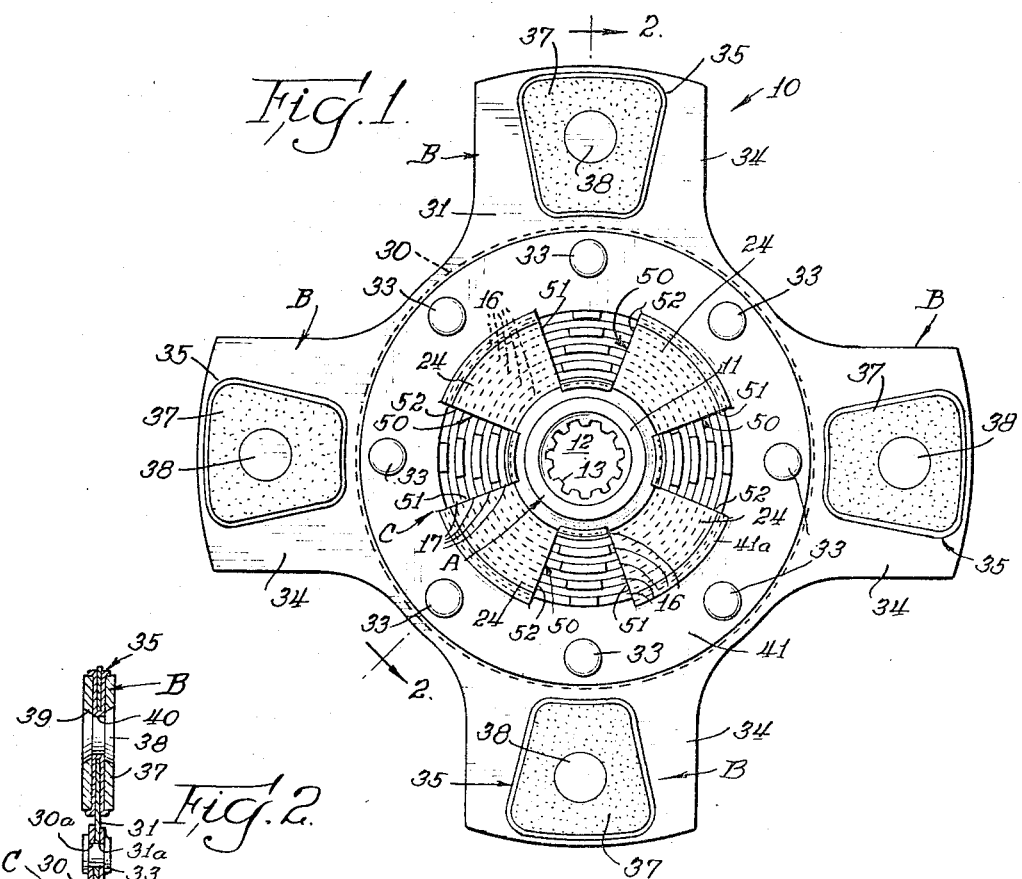

3,280,949
FRICTION DRIVEN ELEMENT EMPLOYING
VIBRATION DAMPENING MEANS
Louis Ross, Rockford, Ill., assignor to Borg-Warner Corporation, Chicago, Ill., a corporation of Illinois
Filed Sept. 3, 1964, Ser. No. 394,252
5 Claims. (Cl. 192—107)

This invention relates to friction driven plates and more particularly to plates employing vibration dampening means.

The primary object of this invention is to provide a vibration dampening means for a friction driven plate which will operate with multiple spring rates, the number of different rates being variable to meet the specific application.

Another object of this invention is to provide a friction driven plate of the above type, in which the dampening means employs a plurality of concentrically arranged resilient rings alternately interposed and bonded between a plurality of concentrically arranged rigid rings, said dampening means limiting the degree of relative rotation between the rigid rings so that torsional stress in said bonds and rubber will be increasingly reduced as greater torque loads are transmitted through the device. A specific feature pursuant to this object is the provision of a splined hub element having a radially directed flange provided with a plurality of circumferentially spaced slots, the rigid rings havings lugs effective to engage a side of one of the slots to limit further arcuate travel of the associated rigid ring and thereby provide a mechanical connection between the associated ring and the hub.

Other objects and advantages of this invention will become apparent from the following detailed description taken in connection with the accompanying drawings, in which:

FIGURE 1 is a side elevational view of a friction driven plate employing the principles of this invention;

FIGURE 2 is a sectional view taken substantially along line 2—2 of FIGURE 1; and FIGURE 3 is a fragmentary side view of one of the rigid rings forming part of the vibration dampening means.

Turning now to the drawings, the friction driven plate, generally designated 10, broadly comprises a driven output means A adapted to be splined to a driven shaft, a driving input means B effective to receive a frictional load, and vibration dampening means C interconnecting said input and output means.

The output means A more particularly comprises a forged hub 11 having a central opening 12, the walls defining said opening 12 having a plurality of splines 13 directed parallel to the axis 14 of rotation. The outer cylindrical surface 15 of the hub is annular in configuration and has bonded thereto the innermost portion of the vibration dampening means C. Extending outwardly from the hub 11 and adjacent the cylindrical surface 15, is an annular flange having generally flat sides 24a and 24b. The general radial extent of flange 24 approximates the radial extent of the dampening means C. Flange 24 has equi-circumferentially spaced slots 50 defined therein with side walls 51 and 52 of each extending generally radially inwardly the full depth of the flange (the invention comprises alternative configurations for said slots 50 which serve to provide angular stops against which the means C may operate).

The vibration dampening means C comprises a plurality of rigid drive rings 16 (here being five in number designated 16a, 16b, 16c, 16d and 16e) concentrically arranged and having the radially innermost ring 16a bonded to the outer surface 15 of the hub. Alternately interpersed between each of the drive rings is a plurality of resilient springs or rings 17 (here being four in number designated 17a, 17b, 17c and 17d) concentrically arranged one within the other. The radially inner annular surface 18 of each resilient ring is bonded to the next adjacent radially outer annuar surface 19 of a rigid ring; similarly, the radially outer annular surface 20 of each resilient ring is bonded to the next adjacent radially inner surface 21 of a rigid ring (see FIG. 3). Each of the rigid and resilient rings are substantially uniform in width, except that the rigid rings 16 are each provided with a plurality of lugs 23 (here four equi-circumferentially spaced on each rigid ring and designated for each rigid ring as 23b, 23c, 23d and 23e); the lugs viewed as a group are arranged in radially aligned series (see FIG. 1). Each of the lugs extends through one of the slots 26 provided in the hub flange and have a predetermined arcuate dimension "L" effective to engage the slot to regulate the degree of torque transmitted through an associated resilient ring.

The input means B (that portion effective to be clamped by friction elements, not shown, and thereby rotatively drive the disc for transmission power) comprises an annular plate 30 secured (as by welding) to an intermediate portion of the outer surface of rigid ring 23e and is provided with a plurality of circumferentially spaced openings 30a; another plate 31 provided having an annular inner body secured to the plate 30 by siutable fasteners 33 each extending through one of said openings 30a and one of a plurality of openings 31a in the plate 31. The plate 31 has a plurality of radially outwardly extending ears 34 upon each of which is mounted oppositely extending cerametalic friction elements 35; each friction element is comprised of a cup shaped retainer within which is disposed cerametalic friction material 37 and secured in place by fasteners 38 extending through central openings 39 provided in the friction elements and openings 40 in the ears 34.

To regulate the hysteresis or damping capacity of means C, a friction drag bracket 41 is provided, annular in configuration, and having an outwardly turned lip 41a effective to frictionally engage the outer periphery of the hub flange 24. The bracket 41 is fastened to the plates 30 and 31 by the said fasteners 33.

For purposes of describing the operation of dampening means, it is immaterial whether the input or output means is considered as held stationary while torque is applied to the other; it is the relative movement between the input and output means due to applied torque and load that must be considered. As such relative torque is initially applied, the friction input means will turn relative to the hub and all four of the resilient rings will undergo stress and deflection in series, thereby providing the softest spring rate (smallest pound-foot per degree of rotation) which is employed at the smaller initial torque values. The arcuate extent L of the lugs varies progressively from the inner to the outer ring so as to provide for a progressive variance in angular freedom within said slots. At some predetermined and established torque level, which may be about one-fourth of the full-rated torque capacity, the drive lugs 23b of rigid ring 16b will have deflected torsionally to one side of each of the slots 50 in the hub flange 24. Upon such engagement, the resilient ring 17a will undergo no further increase in torque, and the spring rate will now increase due to a lesser number (here three) of resilient rings remaining to deflect. Similarly in sequence, the remaining three resilient rings 17b, 17c and 17d will successively reach limits of deflection that increase the spring rate at the achievement of each such limit, until a maximum rated torque value is reached with only one resilient ring effective to deflect.

Thus, the above dampener construction provides multiple spring rates throughout the range of operation of the driven plate, there being as many spring rates as there are resilient rings. The variance in spring rate being a result of limitation in succession of each resilient ring so that there will be in the preferred embodiment, first four, then three and then two resilient rings in series, finally only one. Furthermore, torsional stresses in the resilient rings and in the bonds between the resilient rings and the rigid rings are considerably less as a result of the multiple spring rate construction than that compared with a single spring rate construction of the prior art. This is due to the fact that a considerable part of the torque is successively transmitted through the hub and thence through the lugs which are integral with the drive rings and ultimately to the friction material. These torsional stresses are of real consequence in the feasibility of any dampener so that reduction is of definite practical value.

While I have described my invention in connection with one specific embodiment and other alternative embodiments thereof, it is to be understood that these are by way of illustration and not by way of limitation and the scope of my invention is defined solely by the appended claims which should be construed as broadly as the prior art will permit.

I claim:

1. A torsional vibration dampening means, comprising: rotative input means, rotative output means, a nest of concentrically arranged alternating rigid and resilient rings, said nest of rings being disposed to encircle said output means and nesting within said input means, said nest of rings interconnecting said input and output means for transmitting dampened rotary drive therebetween, and means interconnecting said resilient and rigid rings in series whereby the arcuate deflection of each of said rigid rings become additive in permitting relative rotary movement between said input and output means, and means limiting the deflection of at least one of said rigid rings while permitting freedom of movement of the other said rigid rings for varying the dampening effect of said nest of rings.

2. A friction element as in claim 1, in which said resilient rings each are of uniform radial thickness.

3. A friction element as in claim 1 in which said rigid rings are interconnected to said metal rings by complete bonding of said adjacent surfaces.

4. A friction element, comprising: rotative input means, rotative output means to which is applied a load, means interconnecting said rotative input and output means comprising a plurality of concentrically arranged annular rigid members, the radially inner rigid member being drivingly connected to one of said output or input means and the outer radial rigid member being drivingly connected with the other of said output or input means, a plurality of concentrically arranged annular resilient members, one resilient member each interposed between adjacent rigid members with the inner and outer peripheries of each said resilient member joined to the adjacent rigid member whereby said rings may arcuately deflect in proportion to the degree of transmitted torque to provide a combined spring rate for damping out vibration, and stop means carried by one of the output and input means to which said radially inner rigid member is connected and being effective to sequentially limit the arcuate deflection of said rigid members relative to each other thereby varying said combined spring rate.

5. A friction driven plate having torsional vibration dampening characteristics, comprising; an annular hub effective to receive rotative power and carrying an annular radially outwardly extending flange provided with at least one slot defined by radially directed side walls with a predetermined included angle, a plurality of alternately stacked concentrically arranged resilient and rigid rings, said rigid rings each having at least one lug provided thereon extending through said slot of said hub flange, means drivingly connected to the radially outer rigid ring for receiving a frictional load, said rings being disposed about said hub and effective to transmit torque between said hub and friction means while at the same time providing an aggregative spring rate to damp out vibrations, each of said lugs having opposite ends inscribed by an included angle with respect to the axis of said hub, said included angles progressively differing from each other in a manner so that the radially innermost lug has the greatest included angle, said lugs being effective to sequentially engage a side of said slot for limiting deflection thereof whereby the aggregative spring rate of said device may be sequentially varied.

References Cited by the Examiner

UNITED STATES PATENTS

| | | | |
|---|---|---|---|
| 1,896,968 | 2/1933 | Paton | 192—55 X |
| 2,234,443 | 3/1941 | Macbeth | 64—27 X |
| 2,910,843 | 11/1959 | Happ et al. | 64—27 X |
| 3,023,593 | 3/1962 | Nallinger | 64—27 |

DAVID J. WILLIAMOWSKY, *Primary Examiner.*

BENJAMIN W. WYCHE, *Examiner.*